United States Patent [19]

Chandra et al.

[11] Patent Number: 4,762,895

[45] Date of Patent: Aug. 9, 1988

[54] PROCESS FOR THE PREPARATION OF PRECERAMIC METALLOPOLYSILANES AND THE POLYMERS THEREFROM

[75] Inventors: Grish Chandra; Gregg A. Zank, both of Midland, Mich.

[73] Assignee: Dow Corning Corporation, Midland, Mich.

[21] Appl. No.: 83,119

[22] Filed: Aug. 10, 1987

[51] Int. Cl.$^4$ ............................................. C08F 283/00
[52] U.S. Cl. ........................................ 525/474; 528/9; 528/10; 528/25; 528/20; 528/21; 528/22; 525/477
[58] Field of Search ................. 528/9, 10, 25, 20, 21, 528/22; 525/474, 477

[56] References Cited

U.S. PATENT DOCUMENTS

| | | | |
|---|---|---|---|
| 4,159,509 | 5/1979 | Yajima et al. | 528/25 |
| 4,220,600 | 9/1980 | Yajima et al. | 556/434 |
| 4,347,347 | 8/1982 | Yajima et al. | 528/31 |
| 4,359,559 | 11/1982 | Yajima et al. | 528/25 |
| 4,482,689 | 11/1984 | Haluska | 528/25 |
| 4,537,942 | 8/1985 | Brown-Wensley et al. | 528/12 |

FOREIGN PATENT DOCUMENTS

| | | |
|---|---|---|
| 0048957 | 7/1982 | European Pat. Off. |
| 58-213023 | 12/1983 | Japan. |
| 59-161430 | 12/1984 | Japan. |

*Primary Examiner*—Melvyn I. Marquis
*Attorney, Agent, or Firm*—James E. Bittell

[57] ABSTRACT

A process for the preparation of preceramic metallopolysilanes is described. The process consists of contacting and reacting organohalogendisilanes with metal-containing compounds in the presence of a redistribution catalyst in an inert, essentially anhydrous atmosphere while removing volatile byproducts. The resulting metallopolysilanes contain significant amounts of aluminum, boron, chromium, lanthanum, molybdenum, neodymium, niobium, samarium, tantalum, titanium, tungsten, vanadium, yttrium, or zirconium. Such metallopolysilanes can be prepared with relatively low oxygen levels. These polymers are useful as chemical intermediates to synthesize organosilicon materials or polymers. These polymers are also useful, when fired at high temperatures, to form ceramic materials.

62 Claims, No Drawings

PROCESS FOR THE PREPARATION OF PRECERAMIC METALLOPOLYSILANES AND THE POLYMERS THEREFROM

BACKGROUND OF THE INVENTION

This invention relates to the preparation of metallopolysilanes. More specifically this invention relates to the preparation of metallopolysilanes which contain significant amounts of aluminum, boron, chromium, lanthanum, molybdenum, neodymium, niobium, samarium, tantalum, titanium, tungsten, vanadium, yttrium, or zirconium. Such metallopolysilanes can be prepared with relatively low oxygen contents. These polymers are useful as chemical intermediates to synthesize other metal-containing organosilicon materials or polymers. These polymers can also be converted, when fired at high temperatures, to ceramic materials. Ceramic materials can be produced which are low in oxygen.

What is disclosed herein is a novel process to obtain novel metallopolysilanes which consists of contacting and reacting organohalogendisilanes with metal-containing compounds in the presence of a redistribution catalyst in an inert, essentially anhydrous atmosphere and removing volatile byproducts.

Haluska in U.S. Pat. No. 4,482,689 (issued Nov. 13, 1984) described a method of preparing metallosilazane polymers containing boron, phosphorous, or titanium by reacting chlorine-containing disilanes with disilazanes and a reactive metal halide without any added catalyst. When the Haluska reaction mixture was heated in an inert, essentially anhydrous atmosphere the following reactions, where

is the reactive metal halide, were thought to take place:

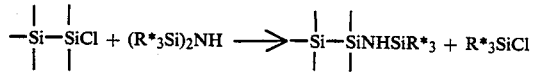

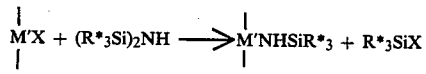

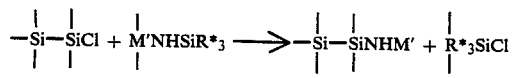

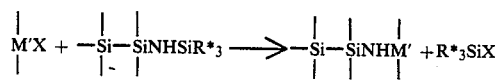

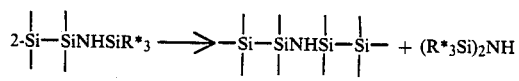

and

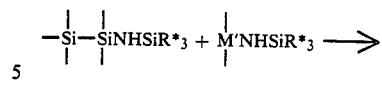

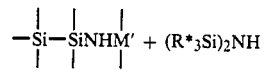

where M' is boron, phosphorous, or titanium, X is halogen, and R* is an alkyl radical containing 1 to 3 carbon atoms, a vinyl radical, or a phenyl radical. Based on this reaction scheme, the incorporation of the metal into the polysilazane occurs only through the silazane moiety. In other words, Haluska teaches that there is no direct interaction between the chlorine in the disilanes and the metal halides.

Yajima et al. in U.S. Pat. No. 4,220,600 (issued Sept. 2, 1980) disclosed a method for preparing a polycarbosilane by reacting a polyborosiloxane with a polysilane. The polyborosiloxanes were prepared by reacting boric acid (or its ester) with a diorganodichlorosilane or by reacting boric acid with diorganodialkoxylsilane. The preparation of borosiloxane polymers from boric acid and phenylsilane is described by Yajima et al. in U.S. Pat. No. 4,152,509 (issued May 1, 1979). The required polysilanes were prepared by dechlorinating a dichlorosilane with sodium metal. Therefore the method of Yajima required at least three reaction steps to prepare a polycarbosilane. The polycarbosilane contained significant amounts of oxygen in the polymer chain in the form of siloxane or B-O bonds. The polycarbosilane formed a ceramic material upon firing at high temperature. The ceramic yield was higher for the boron-containing polycarbosilane relative to a similar polycarbosilane without boron.

In U.S. Pat. No. 4,359,559 (issued Nov. 16, 1982), Yajima et al. repeated the preparation of a polymetallocarbosilane by reacting a polycarbosilane containing

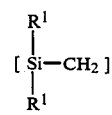

units with metal-containing compounds of the formula M"B$_4$ where R$^1$ was a hydrogen atom, lower alkyl radical, or a phenyl radical and M" was either titanium or zirconium and B was an alkoxy group, a phenoxy group, or an acetylacetoxy group. The polymetallocarbosilane produced by this method contains significant amounts of oxygen in the polymer chain in the form of M"-O bonds. A ceramic material was formed upon firing the polymetallocarbosilane at elevated temperatures.

In U.S. Pat. No. 4,347,347 (issued Aug. 31, 1982), Yajima et al. disclosed an organometallic copolymer containing a polycarbosilane portion and a polymetallosiloxane portion which were crosslinked. This copolymer was prepared by reacting a polycarbosilane with a polymetallosiloxane which contained units of formula —[M"—O]— where M" is either titanium or zirconium and siloxane units of formula —[Si—O]—. This process consists of at least three steps since neither the polycarbosilane or polymetallosiloxane are readily available. The copolymer produced contains significant amounts of oxygen in the polymer chain in the form of siloxane units and —[M"—]— units. Upon firing at elevated temperatures the copolymer is converted to a ceramic material.

In European Patent Application No. 0048957 (published July 4, 1982) Yajima prepared ceramic fibers from vanadium-modified polycarbosilanes which contained significant amounts of oxygen. The vanadium-modified polycarbosilanes were prepared by reacting polysilanes with either a polyvanadiosiloxane or a vanadium complex containing oxygen at temperatures between 250° and 500° C..

In Japanese Kokai Tokoyo Koho No. 58/213023 and No. 59/161430 titanium- or zirconium-containing preceramic polymers were prepared by reacting polysilanes with titanium alkoxides or zirconium alkoxides. Such materials are expected to contain significant oxygen levels in the form of —[Ti—O]— or —[Zr—O]— units.

What has been newly discovered is that certain metallopolysilanes containing only limited oxygen can be prepared by reacting disilanes with certain reactive metal-containing compounds.

THE INVENTION

This invention relates to a method of preparing a halogen-containing metallopolysilane, which method comprises treating a mixture of organohalogendisilanes containing 1 to 10 weight percent reactive metal compound, where the reactive metal compound contains a metal M selected from the group consisting of aluminum, boron, chromium, lanthanum, molybdenum, neodymium, niobium, samarium, tantalum, titanium, tungsten, vanadium, yttrium, and zirconium, with 0.001 to 10 weight percent of a rearrangement catalyst at a temperature of 100° to 340° C. while distilling by-produced volatile materials until there is produced a halogen-containing metallopolysilane composed of [$R_2Si$], [RSi], and [M]0 units where R is an alkyl radical containing 1 to 4 carbon atoms and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [$R_2Si$] units, 40 to 99.9 mole percent of [RSi] units, and 0.1 to 10 mole percent of [M] units, and where the other bonds on silicon are attached to other silicon atoms and halogen atoms.

This invention also relates to a method of preparing a halogen-containing metallopolysilane, which method comprises treating a mixture of organohalogendisilanes containing 0 to 60 weight percent of a monoorganosilane of formula $R'SiX_3$ and 1 to 10 weight percent reactive metal compound, where R' is an alkyl radical containing five or more carbon atoms or a phenyl radial, X is chlorine or bromine, and the reactive metal compound contains a metal M selected from the group consisting of aluminum, boron, chromium, lanthanum, molybdenum, neodymium, niobium, samarium, tantalum, titanium, tungsten, vanadium, yttrium, and zirconium, with 0.001 to 10 weight percent of a rearrangement catalyst at a temperature of 100° to 340° C. while distilling by-produced volatile materials until there is produced a halogen-containing metallopolysilane composed of [$R_2Si$], [RSi], [R'Si], and [M] units where R is an alkyl radical containing 1 to 4 carbon atoms, R' is an alkyl radical containing five or more carbon atoms or a phenyl radical, and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [$R_2Si$] units, 40 to 99.9 mole percent of [RSi] units, 0 to 99.9 mole percent [R'Si] units, and 0.1 to 10 mole percent of [M] units, and where the other bonds on silicon are attached to other silicon atoms and halogen atoms.

This invention also relates to a halogen-containing metallopolysilane composed of [$R_2Si$], [RSi], and [M] units where R is an alkyl radical containing 1 to 4 carbon atoms and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [$R_2Si$] units, 40 to 99.9 mole percent of [RSi] units, and 0.1 to 10 mole percent of [M] units, and where the other bonds on silicon are attached to other silicon atoms and halogen atoms.

This invention also relates to a halogen-containing metallopolysilane composed of [$R_2Si$], [RSi], [R'Si], and [M] units where R is an alkyl radical containing 1 to 4 carbon atoms, R' is an alkyl radical containing at least 5 carbon atoms or a phenyl radical, and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [$R_2Si$] units, 40 to 99.9 mole percent of [RSi] units, 0 to 99.9 mole percent [R'Si] units, and 0.1 to 10 mole percent of [M] units, and where the other bonds on silicon are attached to other silicon atoms and halogen atoms.

This invention also relates to a method of preparing a R" radical-containing metallopolysilane, which method consists of reacting under anhydrous conditions, a halogen-containing metallopolysilane with a Grignard reagent having the general formula R"MgX' or an organolithium compound having the general formula R"Li where X' is chlorine, bromine, or iodine and R" is an alkyl radical containing 1 to 20 carbon atoms, a vinyl radical, or a phenyl radical, at a temperature of 0° to 120° C., in a suitable solvent, and thereafter recovering the R" radical-containing metallopolysilane; where the halogen-containing metallopolysilane is composed of [$R_2Si$], [RSi], [R'Si], and [M] units where R is an alkyl radical containing 1 to 4 carbon atoms, R' is an alkyl radical containing at least 5 carbon atoms or a phenyl radical, and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [$R_2Si$] units, 40 to 99.9 mole percent of [RSi] units, 0 to 99.9 mole percent [R'Si] units, and 0.1 to 10 mole percent of [M] units, and where the other bonds on silicon are attached to other silicon atoms and halogen atoms.

This invention also relates to a method of preparing a R'"O- or RO-containing metallopolysilane, which method consists of reacting under anhydrous conditions, a halogen-containing metallopolysilane with a reagent selected from the group consisting of (i) carbinols having the general formula R'''OH, (ii) alcoholates having the general formula R'''OQ, and (iii) alkyl orthoformates having the general formula (RO)₃CH wherein R''' is an alkyl radical containing 1 to 4 carbon atoms or a phenyl radical, R is an alkyl radical containing 1 to 4 carbon atoms, and Q is sodium, potassium, or lithium, at a temperature of 0° to 110° C., in a suitable solvent, and thereafter recovering the R'''O— or RO-containing metallopolysilane; where the halogen-containing metallopolysilane is composed of [R₂Si], [RSi], [R'Si], and [M] units where R is alkyl radical containing 1 to 4 carbon atoms, R' is an alkyl radical containing at least 5 carbon atoms or a phenyl radical, and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [R₂Si] units, 40 to 99.9 mole percent of [RSi] units, 0 to 99.9 mole percent [R'Si] units, and 0.1 to 10 mole percent of [M] units, and where the other bonds on silicon are attached to other silicon atoms and halogen atoms.

This invention also relates to a method of preparing a R$^{iv}$₂N-containing metallopolysilane, which method consists of reacting under anhydrous conditions, a halogen-containing metallopolysilane with an aminolysis reagent having the general formula NHR$^{iv}$₂ wherein R$^{iv}$ is hydrogen, an alkyl radical containing 1 to 4 carbon atoms, a phenyl radical or a —SiR$^{v}$₃ radical wherein R$^{v}$ is an alkyl radical containing 1 to 4 carbon atoms, a vinyl radical, or a phenyl radical, at a temperature of from 25° to 100° C., in a suitable solvent, and thereafter recovering the R$^{iv}$₂N-containing metallopolysilane; where the halogen-containing metallopolysilane is composed of [R₂Si], [RSi], [R'Si], and [M] units where R is an alkyl radical containing 1 to 4 carbon atoms, R' is an alkyl radical containing at least 5 carbon atoms or a phenyl radical, and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [R₂Si] units, 40 to 99.9 mole percent of [RSi] units, 0 to 99.9 mole percent [R'Si] units, and 0.1 to 10 mole percent of [M] units, and where the other bonds on silicon are attached to other silicon atoms and halogen atoms.

The metallopolysilanes of this invention contain [RSi] and [M] units and, optionally, [R₂Si] and [R'Si] units. [M] is simply a shorthand way of indicating the presence of the metal in the polymer and is not meant to indicate that the metal-containing units only contain the metallic element. Further, it is unlikely that all metal-containing units will be identical. For example, when the reactive metal compound is a metal halide of general formula MX₃, [M] may represent

as well as other metal-containing units. Other reactive metal compounds can give rise to similar metal-containing units in metallopolysilanes.

The metallopolysilanes of this invention are prepared by reacting a mixture of organohalogendisilanes or a mixture of organohalogendisilanes and monoorganosilanes with a reactive metal compound in the presence of a rearrangement catalyst.

The organohalogendisilanes useful in this invention are those disilanes having the general formula

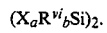

In this formula, R$^{vi}$ is an alkyl radical containing 1 to 4 carbon atoms, a vinyl group, or a phenyl group and X is either chlorine or bromine. Thus, those R$^{vi}$ groups which are contemplated as being useful in this invention are methyl, ethyl, propyl, butyl, vinyl and phenyl. For purposes of this invention, the R$^{vi}$ groups can all be the same or they can be different. Preferably R$^{vi}$ is a methyl group. The preferred organohalogendisilanes are chlorine-containing disilanes where R$^{vi}$ is a methyl group. The chlorine-containing disilanes can be those found in the residue from the Direct Process for producing halosilanes (Eaborn, C., "Organosilicon Compounds", Butterworth Scientific Publications, London, 1960, pg. 1). For purposes of this invention, the values of a and b are from 0.5 to 3 and 0 to 2.5, respectively, and the sum of (a+b) is equal to three. The disilanes may be symmetrical or non-symmetrical. Examples of chlorine-containing disilanes useful in this invention are [Cl(CH₃)₂Si]₂, (Cl₂CH₃Si)₂, (Cl₂C₂H₅Si)₂, [Cl(C₆H₅)₂Si]₂ and (Cl₂CH₂=CHSi)₂.

Monosilanes may also be used in admixtures with the above organohalogendisilanes. Monosilanes useful in admixture with the organohalogendisilanes of this invention include, for example, CH₃SiCl₃, (CH₃)₂SiCl₂, H(CH₃)₂SiCl, (CH₃)₃SiCl, (CH₂=CH)(CH₃)₂SiCl, (C₆H₅)(CH₂=CH)(CH₃)SiCl, (C₂H₅)₂SiCl₂, (C₆H₅)(CH₂=CH)SiCl₂, C₆H₅SiCl₃, (C₆H₅)₂SiCl₂, (C₆H₅)₃SiCl, (n-octyl)SiCl₃, (n-dodecyl)SiCl₃, and the like. When monosilanes are included in the disilane mixture they will normally be present at levels up to about 60 weight percent. Preferred monosilanes are of the general formula R'SiX₃ where R' is an alkyl radical containing at least five carbon atoms or a phenyl radical and X is chlorine or bromine. Preferably, R' is an alkyl radical containing 6 to 20 carbon atoms or a phenyl radical. When such monosilanes are included in the reaction mixture of this invention, a halogen-containing metallopolysilane composed of [R₂Si], [RSi], [R'Si], and [M] units which contains 0 to 59.9 mole percent of [R₂Si] units, 40 to 99.9 mole percent of [RSi] units, 0 to 99.9 mole percent [R'Si] units, and 0.1 to 10 mole percent of [M] units, will be produced. Particularly preferred R' radicals in the formula R'SiX₃ are alkyl radicals containing 6 to 20 carbon atoms or a phenyl radical.

Also considered within the scope of this invention is the use of mixtures of organohalogendisilanes, especially chlorine-containing organodisilanes. It is generally preferred that when organohalogendisilane mixtures are employed, the number of units of diorgano-substituted silicon atoms should not exceed the number of units of monoorgano-substituted silicon atoms.

The reactive metal compounds useful in this invention contain a metal atom M selected from the group consisting of aluminum, boron, chromium, lanthanum, molybdenum, neodymium, niobium, samarium, tantalum, titanium, tungsten, vanadium, yttrium, and zirconium. The reactive metal compound should either be liquid at the reaction temperature or be soluble in the reaction mixture. It is sufficient if the reactive metal compound is soluble at temperatures approaching the reaction temperature or becomes soluble during the reaction; solubility at room temperature is not required. In some cases the solubility of the reactive metal compound appears to be enhanced by increasing the amount of the rearrangement catalyst. The reactive metal compound must be such that it will incorporate into the polysilane under the reaction conditions so that the resulting metallopolysilane contains 0.1 to 10 mole percent of [M] units. Suitable reactive metal compounds include metal halides such as $AlCl_3$, $AlBr_3$, $AlI_3$, $BBr_3$, $BCl_3$, $BBr_2I$, $BBrI_2$, $BI_3$, $CrCl_2$, $CrCl_3$, $LaCl_3$, $MoCl_5$, $NdCl_3$, $NbCl_5$, $SmCl_3$, $TaCl_5$, $TiBr_4$, $TiCl_4$, $WBr_2$, $WBr_5$, $WBr_6$, $WCl_4$, $WCl_5$, $WCl_6$, $VCl_3$, $YBr_3$, $YCl_3$, $ZrBr_2$, $ZrBr_3$, $ZrBr_4$, $ZrCl_2$, $ZrCl_3$, $ZrCl_4$, and the like. Preferred metal halides include $AlBr_3$, $AlCl_3$, $BBr_3$, $BCl_3$, $TiBr_4$, $TiCl_4$, $YBr_3$, $YCl_3$, $ZrBr_4$, and $ZrCl_4$. Organometallic compounds are also suitable reactive metal compounds. Examples of such organometallic compounds include bis(cyclopentadienyl)molybdenum dichloride, bis(cyclopentadienyl)niobium tribromide, bis(cyclopentadienyl)tantalum tribromide, bis(cyclopentadienyl)titanium dichloride, bis(cyclopentadienyl)vanadium dichloride, bis(cyclopentadienyl)vanadium dibromide, bis(cyclopentadienyl)zirconium dichloride, bis(cyclopentadienyl)zirconium chloride hydride, bis(cyclopentadienyl)zirconium dihydride, chromium hexacarbonyl, molybdenum hexacarbonyl, tungsten hexacarbonyl, and the like. The reactive metal compounds should be present in an amount such that the resulting metallopolysilane contains from about 0.1 to about 10 mole percent of the metal associated with the metal compound (i.e., aluminum, boron, chromium, lanthanum, molybdenum, neodymium, niobium, samarium, tantalum, titanium, tungsten, vanadium, yttrium, or zirconium). Higher amounts of the metal may be incorporated into the metallopolysilanes but such higher amounts do not seem to provide any additional benefit. It is generally preferred that the metallopolysilane contains about 0.5 to 5.0 mole percent of the metal atom. Combinations of metal compound reactants may also be employed.

As noted earlier, the metallopolysilanes of this invention contain about 0.1 to 10 mole percent [M] units. Assuming, for illustration purposes only, a metallopolysilane containing [$CH_3Si$] and [M] units only, the 0.1 to 10 mole percent range roughly corresponds, for boron, to 0.02 to 3 weight percent; for aluminum, to 0.4 to 7 weight percent; for titanium, vanadium, and chromium, 0.1 to 11 weight percent; yttrium, zirconium, lanthanum neodymium, niobium, samarium, and molybdenum, 0.2 to 20 weight percent; and for tantalum and tungsten, 0.4 to 32 weight percent.

The organodisilanes and reactive metal compounds are reacted in the presence of a rearranged catalyst. Suitable rearrangement catalysts include ammonium halides, tertiary organic amines, quaternary ammonium halides, quaternary phosphonium halides, hexamethylphosphoramide, and silver cyanide. Preferred catalysts includes quaternary ammonium halides having the formula $Z_4NX''$, quaternary phosphonium halides having the formula $Z_4PX''$, and hexamethylphosphoramide where Z is an alkyl or aryl radical and $X''$ is halogen. Preferably Z is an alkyl radical containing 1 to 6 carbon atoms or a phenyl radical and $X''$ is chlorine or bromine. One especially preferred catalyst is tetra-n-butylphosphonium bromide.

The amount of catalyst utilized can range from 0.001 to 10 weight percent and preferably from 0.1 to 2.0 weight percent based on the weight of the starting disilane or starting disilane/monoorganosilane mixture.

The catalysts and starting materials require anhydrous conditions and therefore one must take care to insure that moisture is excluded from the reaction system when the reactants are mixed. Generally this can be done by using a stream of dry nitrogen or argon as a cover over the reaction mixture.

These reactants are brought together in an inert, essentially anhydrous atmosphere. For purposes of this invention what we mean by "inert" is that the reaction is carried out under a blanket of inert gas, such as argon, nitrogen, or helium. What we mean by "essentially anhydrous" is that the reaction is preferably carried out in an absolutely anhydrous atmosphere but minute amounts of moisture can be tolerated.

Generally, the reactants (disilanes and reactive metal compound along with the rearrangement catalyst) are heated with the volatile byproducts being removed simultaneously. If desired, however, the reactants may be initially heated without removing the volatile byproducts. For example, the reactants may initially be heated under reflux condition and the volatile byproducts being removed at a later time.

The order of addition of the reactants does not appear to be critical. As the temperature is raised higher, more condensation takes place and crosslinking occurs. By controlling the reaction time and final reaction temperature one can stop the reaction at any point to obtain almost any desired viscosity. The desirable temperature range for this reaction is 25° to 300° C. The most preferred range is 125° to 250° C. The length of time that the reaction requires depends on the temperature and the viscosity one wishes to achieve.

What is meant by "volatile products" are the distillable by-produced products that are formed during the rearrangement and redistribution reactions. These materials can be represented by $(CH_3)_3SiCl$, $CH_3(C_6H_5)_2SiCl$, $(CH_3)_2C_6H_5SiCl$, $H(CH_3)_2SiCl$, and the like. Sometimes, these materials require the use of a vacuum along with the heat in order to remove them from the reaction mixture.

The metallopolysilanes are then essentially ready to use. The metallopolysilanes may be vacuum stripped prior to use if desired. The metallopolysilanes may be pyrolyzed in an inert atmosphere or in a vacuum at temperatures of at least 750° C. to give a ceramic material. If the polymer is of sufficient viscosity, it can be shaped first (such as an extruded fiber) and then pyrolyzed to give a ceramic material or the polymers can be filled with ceramic type fillers (if desired) and then fired to at least 750° C. to obtain filled ceramic materials. For fiber preparation, it is preferred that the metallopolysilane be dissolved in an organic solvent such as toluene and then filtered through a submicron filter before forming the fiber. Composites may also be prepared wherein the metallopolysilane serves as the matrix material with high modulus fibers. Composites may, for example, be prepared using the procedures described by Haluska in U.S. Pat. No. 4,460,638 (issued July 7, 1984), which is hereby incorporated by reference.

The metallopolysilanes prepared from organodisilanes and reactive metal compounds may be converted directly to ceramic materials by pyrolysis to elevated temperatures. Because these metallopolysilanes contain significant amounts of halogen, they may also be converted to other preceramic metallopolysilanes with various functional groups. These derivatized metallopolysilanes may then be converted to ceramic materials by pyrolysis at elevated temperatures.

One such derivatized metallopolysilane which can be prepared by the practice of this invention is a R" radical-containing metallopolysilane where R" is an alkyl radical containing 1 to 20 carbon atoms or a phenyl radical. The R" radical-containing metallopolysilane is prepared by reacting a halogen-containing metallopolysilane, under anhydrous conditions, with a Grignard reagent of general formula R"MgX' or with an organolithium compound of general formula R"Li where R" is an alkyl radical containing 1 to 20 carbon atoms, a vinyl radical, or a phenyl radical and X' is chlorine, bromine, or iodine.

The Grignard reagents useful herein are those reagents commonly known in the art for Grignard type reactions. Such materials are, for example, alkyl magnesium halides and aryl magnesium halides. These Grignard reagents have the general formula R"MgX' wherein R" is an alkyl radical of 1 to 20 carbon atoms, a vinyl radical or a phenyl radical and X' is chlorine, bromine, or iodine. Preferred Grignard reagents are $CH_3MgCl$, $(CH_2=CH)MgCl$ and $(C_6H_5)MgCl$. Typical Grignard reaction solvents can be used herein. Preferred are alkyl ethers and tetrahydrofuran. Combinations of Grignard solvents may be used.

The organolithium compounds useful herein are of the general formula R"Li wherein R" is an alkyl radical of 1 to 20 carbon atoms, a vinyl radical, or a phenyl radical. Suitable solvents for the organolithium compounds include toluene, xylene, benzene, tetrahydrofuran, ethers, as well as combinations of such solvents.

Combinations of Grignard reagents and/or organolithium compounds may also be used.

For best results, dry reaction conditions should be observed. Solvents for the halogen-containing metallopolysilane can be any organic solvent in which the material is soluble and which does not react with the material except in the desired manner. Examples of useful solvents include toluene, xylene, benzene, tetrahydrofuran, and ethers. Specifically, toluene is preferred. Generally it has been found preferable to add the halogen-containing metallopolysilane to an excess of Grignard reagent or organolithium compound, both in a solvent solution. This addition and reaction is carried out while the materials are stirred or otherwise agitated. The reaction is carried out in a dry inert atmosphere such as in the presence of nitrogen or argon gas to prevent the introduction of water into the reaction vessel. The reaction can be run at temperaures of 0° to 120° C. but preferably the reaction is run at room temperature or slightly below room temperature to prevent or decrease undesirable side reactions. After the addition of the reagent is complete, the reaction mixture is stirred for a time, with or without heating, to ensure the completion of the reaction. Typically the reaction is carried out for a time period of about 1 to 48 hours. Excess Grignard reagent or organolithium compound is then destroyed using water, HCl, or an alcohol. The reaction mixture is cooled to room temperature and then filtered by conventional means and the solvents and other volatile materials are then removed by stripping under vacuum with the addition of heat. Other separating techniques will be apparent to those skilled in the art. The resulting R" radical-containing metallopolysilanes are generally solids at room temperature.

Another derivatized metallopolysilane is a R'''O— or RO— containing metallopolysilane which may be prepared by reacting a halogen-containing metallopolysilane, under anhydrous conditions, with a reagent selected from the group consisting of (i) carbinols having the general formula R'''OH, (ii) alcoholates having the general formula R'''OQ, and (iii) alkyl orthoformates having the general formula $(RO)_3CH$ where R''' is an alkyl radical containing 1 to 4 carbon atoms or a phenyl radical, R is an alkyl radical containing 1 to 4 carbon atoms, and Q is sodium, potassium, or lithium.

The treating reagents are of three different types; namely, carbinols having the general formula R'''OH; alcoholates having the general formula R'''OQ and alkyl orthoformates having the general formula $(RO)_3CH$ in which R''' is an alkyl radical of 1 to 4 carbon atoms and phenyl, R is an alkyl radical of 1 to 4 carbon atoms, and Q is sodium, potassium or lithium. Specific examples of materials useful in this invention are $CH_3OH$, $CH_3CH_2OH$, $CH_3(CH_2)_3OH$, $NaOCH_3$, $KOCH_3$, $LiOCH_2CH_3$, $(CH_3O)_3CH$, $(CH_3CH_2O)_3CH$ and phenol. Preferred for this invention are the alkyl orthoformates and alcoholates. Most preferred is $NaOCH_3$. A combination of these reagents may also be employed.

Generally, the reagent is used in a stoichiometric excess based on the amount of halogen present in the halogen-containing metallopolysilane to ensure that the alcoholysis reaction is enhanced. Excess reagent as well as any solvents and by-products can be stripped or strip distilled at the end of the reaction. Naturally, the alcoholates will have to be converted to the corresponding alcohol before removal by stripping.

For best results, dry reaction conditions should be observed. Solvents for the halogen-containing metallopolysilanes can be any organic solvent in which the material is soluble and which does not react with the material except in the desired manner. Examples of useful solvents include toluene, xylene, benzene, tetrahydrofuran, and ethers. Specifically, toluene is preferred. Generally, the order of addition of the components is not critical, but it has been found preferable to add the neat reagent to the halogen-containing metallopolysilane in a solvent solution, such as toluene. This addition and reaction is carried out while the materials are stirred or otherwise agitated. The reaction is carried out in a dry inert atmosphere such as in the presence of nitrogen or argon gas to prevent the introduction of water into the reaction vessel. After the addition of the reagent is complete, the reaction mixture is stirred for a time, with or without heating, to ensure the completion of the reaction. Typically the reaction time is about 1.5 to 65 hours. The reaction can be run at temperatures of 25° to 110° C. but preferably the reaction is run at reflux temperature. The reaction mixture is cooled to room temperature and then filtered by conventional means and the solvents and other volatile materials are then removed by stripping under vacuum with or without the addition of heat. Other separating techniques will be apparent to those skilled in the art. The resulting R'''O- or RO-containing metallopolysilanes are generally solids at room temperature.

Another derivatized metallopolysilane may be prepared by reacting a halogen-containing metallopolysilane, under anhydrous conditions, with an aminolysis reagent of general formula $NHR^{iv}_2$ wherein $R^{iv}$ is hydrogen, an alkyl radical containing 1 to 4 carbon atoms, a phenyl radical, or a —$SiR^v_3$ radical where $R^v$ is an alkyl radical containing 1 to 4 carbon atoms, a vinyl radical, or a phenyl radical.

The aminolysis reagents useful in this invention are ammonia or substituted or unsubstituted organic amines having the general formula $NHR^{iv}{}_2$ where $R^{iv}$ is hydrogen, an alkyl radical of 1 to 4 carbon atoms, a phenyl radical, or a —$SiR^v{}_3$ radical where $R^v$ is an alkyl radical of 1 to 4 carbon atoms, a vinyl radical, or a phenyl radical. Each $R^{iv}$ in the general formula $NHR^{iv}{}_2$ may be the same radical or they may be different radicals. Examples of such materials include $NH_3$, $CH_3NH_2$, $C_4H_9NH_2$, $(CH_3)_2NH$, and aniline. Most preferred are $CH_3NH_2$, $C_4H_9NH_2$, and aniline. Combinations of these aminolysis reagents may also be employed. Generally, the aminolysis reagent is used in a stoichiometric excess based on the amount of halogen present in the halogen-containing metallopolysilane to ensure that the aminolysis reaction is enhanced. Excess reagent as well as any solvents and by-products can be removed by filtering and then stripping or strip distilling at the end of the reaction.

For best results, dry reaction conditions should be observed. Solvents for the halogen-containing metallopolysilane can be any organic solvent in which the material is soluble and which does not react with the material except in the desired manner. Examples of useful solvents include toluene, xylene, benzene, tetrahydrofuran, and ethers. Solvents in which the amine hydrochloride salt is insoluble are generally preferred. Specifically, toluene is one such preferred solvent. Generally, the order of addition of the components is not critical, but it has been found preferable to add the neat aminolysis reagent to the halogen-containing metallopolysilane in a solvent solution, such as toluene. This addition and reaction is carried out while the materials are stirred or otherwise agitated. The reaction is carried out in a dry inert atmosphere such as in the presence of nitrogen or argon gas to prevent the introduction of water into the reaction vessel. After the addition of the aminolysis reagent is complete, the reaction mixture is stirred for a time, with or without heating, to ensure the completion of the reaction. Typically the reaction time is about 3 to 96 hours. The reaction can be run at temperatures of 25° to 100° C. but preferably the reaction is heated at refluxing temperature to drive the reaction to completion. The reaction mixture is cooled to room temperature and then filtered by conventional means and the solvents and other volatile materials are then removed by stripping under vacuum with or without the addition of heat. Other separating techniques will be apparent to those skilled in the art. The resulting $R^{iv}{}_2N$-containing metallopolysilanes are generally solids at room temperature.

The halogen-containing metallopolysilanes and derivatized metallopolysilanes of this invention may be converted to ceramic materials by pyrolysis to elevated temperatures. The preceramic metallopolysilane composition is fired to an elevated temperature of at least 750° C. in an inert atmosphere or vacuum until the mixture is converted to a ceramic material. Preferably the pyrolysis temperature is from about 1000° to 1600° C. If the preceramic metallopolysilane composition is of sufficient viscosity or if it possesses a sufficiently low melt temperature, it can be shaped, rendered infusible, and then finally pyrolyzed to give a ceramic shaped article such as a fiber. Preferably the preceramic metallopolysilane compositions used in the practice of this invention have a softening temperature of about 50° to 300° C. and most preferably in the range of 70° to 200° C. Such a softening temperature allows for the formation of preceramic fibers by known spinning techniques. The halogen-containing metallopolysilanes and derivatized metallopolysilanes of this invention may also be used to prepare silicon carbide containing ceramic materials such as films, coatings, composites, and other shaped articles. The halogen-containing metallopolysilanes and derivatized metallopolysilanes may be used as binders and infiltrants in the production of various ceramic materials.

The metallopolysilanes of this invention can be used in both the filled and unfilled state, depending on the application. Thus, it is contemplated within the scope of this invention to coat substrates with filled and unfilled polymers and heat the substrates to produce ceramic coated articles. Fillers or adjuvants can be milled on 3 roll mills by simply mixing the polymers of this invention with the desired fillers or adjuvants and making several passes on the mill. In the alternative, the polymers can be placed in solvents and the fillers or adjuvants can be added thereto and after mixing the solvent can be removed to give the filled polymer. The coating can be applied by conventional means. The means used depends on the polymer and substrates used and the application one has in mind. Thus, these materials can be brushed, rolled, dipped or sprayed. In the filled state, it is sometimes necessary to trowel the polymer onto the substrate.

Whenever the metallopolysilanes are converted to the ceramic state, it is done by pyrolyzing the polymer to a temperature of at least 750° C. in an inert atmosphere or in a vacuum. Attempts to pyrolyze at or above 750° C. without an inert atmosphere lead to undesirable side reactions and therefore, caution should be exercised to be sure to exclude moisture and other potential reactants.

Now, so that those skilled in the art can better appreciate and understand the invention, the following examples are given. The examples are for purposes of illustration only and are not to be regarded as limitations.

The metallopolysilanes of this invention are generally oxygen and moisture sensitive. Therefore, they should be prepared and handled under an inert gas atmosphere. In the following examples, unless otherwise indicated, all procedures were carried out under inert atmosphere.

In the following examples, the analytical methods used were as follows:

Percent silicon was determined by a fusion technique which consisted of converting the silicon material to soluble forms of silicon and then analyzing the soluble material quantitatively for total silicon by atomic absorption spectrometry.

Percent chlorine was determined by fusion of the halides with sodium peroxide and potentiometric titration with silver nitrate.

Carbon, hydrogen, and nitrogen were determined on a C, H, N Elemental Analyzer, Model 240-XA, manufactured by Control Equipment Corporation of Lowell, Mass.

Metal analyses were carried out by fusing the polymers with sodium peroxide in a closed nickel bomb and then dissolving the fusinate in an aqueous system. The metal was analyzed by either atomic adsorption spectrometry or inductively coupled plasma-atomic emission spectrometry. Tungsten and zirconium could not be analyzed by this method.

The metallopolysilanes were fired to elevated temperature using a Lindberg furnace (Model 59744). Treatment of ceramic materials to 1800° C. was carried out in an Astro Industries Furnace 1000A (water cooled graphite heated model 1000.3060-FP-12).

Unless indicated otherwise, the chlorine-containing disilane employed in the following examples was a distillation residue from a Direct Process reaction for the production of chlorosilane from silicon and methylchloride. This mixture was redistilled prior to use. The disilane mixture contained, on the average, about 11 weight percent $(CH_3)_2ClSiSi(CH_3)_2Cl$, 38 weight percent $(CH_3)_2ClSiSiCH_3Cl_2$, 45 weight percent $CH_3Cl_2SiSiCH_3Cl_2$, and 6 weight percent low boilers. The low boilers contain $(CH_3)_2SiCl_2$, $CH_3SiCl_3$, $(CH_3)_3SiCl$, etc.

In the reactions carried out below, the reaction apparatus was essentially the same in each case, unless noted otherwise, and consisted of a 500 or 1000 ml glass, round-bottomed flask equipped with a mechanical stirrer, gas inlet tube, distillation apparatus, and an internal thermocouple to record temperature. The distillation apparatus was equipped to use a vacuum if needed. Reactions were carried out in an inert, usually argon, atmosphere.

Unless otherwise stated, all percentages are by weight.

EXAMPLE 1

A mixture of methylchlordisilanes (716 g) as described above, tetra-n-butyl phosphonium chloride (19 g, 0.065 moles), and $TiCl_4$ (3.5 ml, 0.032 moles) were reacted by heating the mixture (a yellow slurry) to 250° C. to a rate of about 2.0° C./min and holding the temperature at 250° C. for about 45 minutes while removing volatile by-products. At about 100° C. the solution became homogeneous and turned a red color. A brittle red titanium-containing polysilane (121 g, 15.2 percent yield) was obtained. The polysilane contained 42.5 percent silicon, 23.8 percent carbon, 6.2 percent hydrogen, 15.5 percent chlorine, 0.73 percent oxygen, and 1.1 percent titanium. A bulk sample of the titanium-containing polysilane was converted into a ceramic material (ceramic yield of 45.6 percent) by pyrolysis to 1200° C. at a rate of 5.0° C./min and holding at 1200° C. for two hours under an argon atmosphere. The ceramic material contained 68.7 percent silicon, 23.5 percent carbon, 1.2 percent oxygen, and 1.7 percent titanium. Oxidative Stability: A powdered sample of the ceramic material retained 104.7 percent of its mass when treated at 1200° C. for 12 hours in air; the resulting material contained 9.4 percent oxygen. Thermal Stability: A powdered sample of the ceramic material retained 95.9 percent of its mass when heated to 1800° C. for one hour under argon; X-ray analysis of the resulting material showed 10 percent alpha-SiC, 80 percent beta-SiC, and 5 percent TiC.

EXAMPLE 2

A mixture of methylchlorodisilanes (310 g, the same composition as in Example 1), tetra-n-butyl phosphonium chloride (5 g, 0.017 moles), and $ZrCl_4$ (1.9 g, 0.008 moles) were reacted under argon as in Example 1. The original white slurry became homogeneous and clear at about 100° C. A brittle, white zirconium-containing polysilane (70.2 g, 22.1 percent yield) was obtained. The polysilane contained 36.5 percent silicon, 20.1 percent carbon, 5.5 percent hydrogen, 25.0 percent chlorine, 0.85 percent oxygen, and 0.41 percent zirconium. A bulk sample of the zirconium-containing polysilane was converted into a ceramic material (ceramic yield of 26.5 percent) by pyrolysis to 1200° C. as in Example 1. The ceramic material contained 75.5 percent silicon, 32.8 percent carbon, 1.0 percent oxygen, and 0.58 percent zirconium. Oxidative stability was determined as in Example 1; the treated ceramic material retained 123.1 percent of its mass and contained 23.8 percent oxygen. Thermal stability was determined as in Example 1; the treated sample retained 97.2 percent of its mass and contained 10 percent alpha-SiC and 75 percent beta-SiC by X-ray analysis.

EXAMPLE 3

A mixture of methylchlorodisilanes (750 g, the same composition as in Example 1), tetra-n-butyl phosphonium chloride (40 g, 0.13 moles), and $BBr_3$ (10 ml, 0.11 moles) were reacted under argon as in Example 1. The original yellow slurry became homogeneous yellow solution at about 100° C. A brittle, yellow boron-containing polysilane (150.0 g, 18.5 percent yield) was obtained. The polysilane contained 35.0 percent silicon, 25.8 percent carbon, 6.5 percent hydrogen, 21.1 percent chlorine, 0.64 percent oxygen, and 0.85 percent boron. A bulk sample of the boron-containing polysilane was converted into a ceramic material (ceramic yield of 39.0 percent) by pyrolysis to 1200° C. as in Example 1. The ceramic material contained 66.4 percent silicon, 22.5 percent carbon, 3.8 percent oxygen, and 1.4 percent boron. Oxidative stability was determined as in Example 1; the treated ceramic material retained 112.3 percent of its mass and contained 19.5 percent oxygen. Thermal stability was determined as in Example 1; the treated sample retained 88.5 percent of its mass and contained 11 percent alpha-SiC and 70 percent beta-SiC by X-ray analysis.

EXAMPLE 4

A mixture of methylchlorodisilane (300 g, the same composition as in Example 1), tetra-n-butyl phosphonium chloride (12 g, 0.035 moles), and $AlBr_3$ (9.35 g, 0.035 moles) were reacted under argon as in Example 1. The original white slurry became homogeneous yellow solution at about 100° C. A brittle, white aluminum-containing polysilane (88.5 g, 27.5 percent yield) was obtained. The polysilane contained 32.5 percent silicon, 24.6 percent carbon, 7.2 percent hydrogen, 22.3 percent chlorine, 0.30 percent oxygen, and 1.0 percent aluminum. A bulk sample of the aluminum-containing polysilane was converted into a ceramic material (ceramic yield of 28.8 percent) by pyrolysis to 1200° C. as in Example 1. The ceramic material contained 72.3 percent silicon, 23.7 percent carbon, 1.5 percent oxygen, and 1.3 percent aluminum. Oxidative stability was determined as in Example 1; the treated ceramic material retained 118.2 percent of its mass and contained 25.1 percent oxygen. Thermal stability was determined as in Example 1; the treated sample retained 95.1 percent of its mass and contained 6 percent alpha-SiC, 92 percent beta-SiC, and 1 percent Si by X-ray analysis.

EXAMPLE 5

A mixture of methylchlorodisilanes (550 g, the same composition as in Example 1), tetra-n-butyl phosphonium chloride (6 g, 0.020 moles), and $YCl_3$ (7.0 g, 0.035 moles) were reacted under argon as in Example 1. The resulting mixture was a homogenous solution. A brittle, pale-yellow yttrium-containing polysilane (110.0 g, 19.5percent yield) was obtained. The polysilane contained 32.2 percent silicon, 17.4 percent carbon, 4.8 percent hydrogen, 30.0 percent chlorine, 0.24 percent oxygen, and 4.4 percent yttrium. A bulk sample of the yttrium-containing polysilane was converted into a ceramic material (ceramic yield of 28.8 percent) by pyrolysis to 1200° C. as in Example 1. The ceramic material contained 71.0 percent silicon, 19.9 percent carbon, 2.7 percent oxygen, and 1.1 percent yttrium. Oxidative stability was determined as in Example 1; the treated ceramic material retained 127.8 percent of its mass and contained 30.0 percent oxygen. Thermal stability was determined as in Example 1; the treated sample retained 93.5 percent of its mass and contained 4 percent alpha-SiC and 85 percent beta-SiC by X-ray analysis.

EXAMPLE 6

A mixture of methylchlorodisilanes (290 g, the same composition as in Example 1), tetra-n-butyl phosphonium chloride (6.0 g, 0.020 moles), and bis(cyclopentadienyl)titanium dichloride (5.2 g, 0.020 moles) were reacted under argon as in Example 1. The original red slurry became a homogeneous green-yellow solution at about 250° C. A brittle, green-yellow titanium-containing polysilane (70.5 g, 23.3 percent yield) was obtained. The polysilane contained 59.8 percent silicon, 25.5 percent carbon, 5.2 percent hydrogen, 29.6 percent chlorine, 0.45 percent oxygen, and 0.75 percent titanium. A bulk sample of the titanium-containing polysilane was converted into a ceramic material (ceramic yield of 49.9 percent) by pyrolysis to 1200° C. as in Example 1. The ceramic material contained 61.8 percent silicon, 27.9 percent carbon, 1.2 percent oxygen, and 0.8 percent titanium. Oxidative stability was determined as in Example 1; the treated ceramic material retained 110.8 percent of its mass and contained 20.6 percent oxygen. Thermal stability was determined as in Example 1; the treated sample retained 94.8 percent of its mass and contained 10 percent alpha-SiC, 74 percent beta-SiC, and 7 percent TiC by X-ray analysis.

EXAMPLE 7

A mixture of methylchlorodisilanes (290 g, the same composition as in Example 1), tetra-n-butyl phosphonium chloride (6.0 g, 0.020 moles), and bis(cyclopentadienyl)zirconium dichloride (6.0 g, 0.020 moles) were reacted under argon as in Example 1. The original white slurry became a homogeneous clear solution at about 100° C. A brittle, pale yellow zirconium-containing polysilane (51.4 g, 17.0 percent yield) was obtained. The polysilane contained 38.8 percent silicon, 27.9 percent carbon, 6.3 percent hydrogen, 16.0 percent chlorine, and 0.28 percent oxygen. A bulk sample of the zirconium-containing polysilane was converted into a ceramic material (ceramic yield of 45.3 percent) by pyrolysis to 1200° C. as in Example 1. The ceramic material contained 59.3 percent silicon, and 29.3 percent carbon. Oxidative stability was determined as in Example 1; the treated ceramic material retained 104 percent of its mass and contained 20.0 percent oxygen. Thermal stability was determined as in Example 1; the treated sample retained 80.5 percent of its mass and contained 15 percent alpha-SiC and 74 percent beta-SiC by X-ray analysis.

EXAMPLE 8

A mixture of methylchlorodisilanes (280 g, the same composition as in Example 1), tetra-n-butyl phosphonium chloride (6.2 g, 0.021 moles), and tungsten hexacarbonyl (2.2 g, 0.006 moles) were reacted under argon as in Example 1. The original clear solution turned orange-red at about 200° C. A brittle, amber tungsten-containing polysilane (66.7 g, 23.0 percent yield) was obtained. The polysilane contained 37.8 percent silicon, 20.7 percent carbon, 5.7 percent hydrogen, 20.2 percent chlorine, and 0.80 percent oxygen. A bulk sample of the tungsten-containing polysilane was converted into a ceramic material (ceramic yield of 34.8 percent) by pyrolysis to 1200° C. as in Example 1. The ceramic material contained 68.9 percent silicon, 20.5 percent carbon, and 4.2 percent oxygen. Oxidative stability was determined as in Example 1; the treated ceramic material retained 129.6 percent of its mass and contained 37.8 percent oxygen. Thermal stability was determined as in Example 1; the treated sample retained 92.6 percent of its mass and contained 5 percent alpha-SiC, 85 percent beta-SiC, and 5 percent $Si_2W$ by X-ray analysis.

EXAMPLE 9

The boron-containing polysilane (150 g) of Example 3 was dissolved in about 250 ml toluene and cooled to about 0° C. Methyllithium (0.88 moles) in diethylether was then added. The reaction mixture was allowed to warm to room temperature. Volatiles were removed by distillation to about 100° C. Unreacted methyllithium was neutralized with about 50 ml of a saturated aqueous $NH_4Cl$ solution, followed by about 50 ml water. The organic layer was dried with anhydrous $MgSO_4$. After filtration and removal of the solvent by distillation to 200° C. at <1.0 mm Hg, a brittle yellow derivatized boron-containing polysilane (99.3 g, 75.7 percent yield) was obtained. The derivatized polysilane contained 31.8 percent silicon, 41.3 percent carbon, 9.6 percent hydrogen, 5.0 percent chlorine, 4.0 percent oxygen, and 1.2 percent boron. A bulk sample of the derivatized boron-containing polysilane was converted into a ceramic material (ceramic yield of 46.6 percent) by pyrolysis to 1200° C. as in Example 1. The ceramic material contained 53.7 percent silicon, 27.8 percent carbon, 7.4 percent oxygen, and 1.4 percent boron. Oxidative stability was determined as in Example 1; the treated ceramic material retained 103.6 percent of its mass and contained 16.8 percent oxygen. Thermal stability was determined as in Example 1; the treated sample retained 78.5 percent of its mass and contained 11 percent alpha-SiC and 72 percent beta-SiC by X-ray analysis.

EXAMPLE 10

The tungsten-containing polysilane (25 g) of Example 8 was dissolved in about 100 ml toluene and 50 ml tetrahydrofuran and cooled to about 0° C. Methyllithium (0.175 moles) in diethylether was then added. The reaction mixture was allowed to warm to room temperature. Volatiles were removed by distillation to about 100° C. Unreacted methyllithium was neutralized with about 25 ml of a saturated aqueous $NH_4Cl$ solution, followed by about 25 ml water. The organic layer was dried with anhydrous $MgSO_4$. After filtration and removal of the solvent by distillation to 200° C. at <1.0 mm Hg, a brittle yellow derivatized tungsten-containing polysilane (15.9 g, 72.0 percent yield) was obtained. The derivatized polysilane contained 47.0 percent silicon, 34.2 percent carbon, 8.6 percent hydrogen, 0.5 percent chlorine, and 3.5 percent oxygen. A bulk sample of the derivatized tungsten-containing polysilane was converted into a ceramic material (ceramic yield of 40.4 percent) by pyrolysis to 1200° C. as in Example 1. The ceramic material contained 59.9 percent silicon, 27.0 percent carbon, and 5.6 percent oxygen. Oxidative stability was determined as in Example 1; the treated ceramic material retained 101.3 percent of its mass and contained 12.3 percent oxygen. Thermal stability was determined as in Example 1; the treated sample retained 87.5 percent of its mass and contained 3 percent alpha-SiC, 72 percent beta-SiC, and 20 percent $Si_2W$ by X-ray analysis.

EXAMPLE 11

The titanium-containing polysilane (30 g) of Example 1 was dissolved in about 250 ml tetrahydrofuran and cooled to about 0° C. Methylamine was bubbled through the solution for about 45 minutes. The reaction mixture was allowed to warm to room temperature. Argon was then bubbled through the solution at about 50° C. for about one hour to remove unreacted methylamine. After filtration and solvent removal by distillation to 200° C., a brittle orange derivatized titanium-containing polysilane (10.0 g, 34.1 percent yield) was obtained. The derivatized polysilane contained 46.5 percent silicon, 25.4 percent carbon, 5.2 percent hydrogen, 0.25 percent chlorine, 1.0 percent oxygen, 3.0 percent nitrogen, and 0.7 percent titanium. A bulk sample of the derivatized titanium-containing polysilane was converted into a ceramic material (ceramic yield of 63.5 percent) by pyrolysis to 1200° C. as in Example 1. The ceramic material contained 61.3 percent silicon, 24.2 percent carbon, 1.9 percent oxygen, 5.8 percent nitrogen, and 0.9 percent titanium. Oxidative stability was determined as in Example 1; the treated ceramic material retained 106.3 percent of its mass and contained 13.9 percent oxygen. Thermal stability was determined as in Example 1; the treated sample retained 87.7 percent of its mass and contained 8 percent alpha-SiC and 95 percent beta-SiC by X-ray analysis.

EXAMPLE 12

The titanium-containing polysilane (30 g) of Example 6 was dissolved in about 250 ml toluene and cooled to about 0° C. Methylamine was bubbled through the solution for about 45 minutes. The reaction mixture was allowed to warm to room temperature. Argon was then bubbled through the solution at about 50° C. for about one hour to remove unreacted methylamine. After filtration and solvent removal by distillation to 200° C., a brittle red-orange derivatized titanium-containing polysilane (28.0 g, 97.9 percent yield) was obtained. The derivatized polysilane contained 43.1 percent silicon, 27.1 percent carbon, 6.8 percent hydrogen, 1.7 percent chlorine, 1.2 percent oxygen, 5.5 percent nitrogen, and 0.3 percent titanium. A bulk sample of the derivatized titanium-containing polysilane was converted into a ceramic material (ceramic yield of 60.8 percent) by pyrolysis to 1200° C. as in Example 1. The ceramic material contained 57.6 percent silicon, 25.9 percent carbon, 1.6 percent oxygen, 12.4 percent nitrogen, and 0.6 percent titanium. Oxidative stability was determined as in Example 1; the treated ceramic material retained 105.0 percent of its mass and contained 9.8 percent oxygen. Thermal stability was determined as in Example 1; the treated sample retained 81.6 percent of its mass and contained 19 percent alpha-SiC, 78 percent beta-SiC, and 3 percent TiC by X-ray analysis.

EXAMPLE 13

Fibers were prepared using a melt spinning technique by extrusion through a 20 mil spinneret using the titanium-containing polysilane of Example 1 and the boron-containing polysilane of Example 3. In both cases, fibers with diameters of about 25 microns were obtained. The boron-containing polysilane was melt spun at about 130° to 137° C.; the titanium-containing polysilane was melt spun at about 225° to 230° C. The green fiber from the boron-containing polysilane contained about 0.3 percent oxygen. The green fiber from the titanium-containing polysilane contained about 4.6 percent oxygen.

That which is claimed:

1. A method of preparing a halogen-containing metallopolysilane, which method comprises treating a mixture containing 90 to 99.9 weight percent organohalogendisilanes and 0.1 to 10 weight percent reactive metal compound, where the reactive metal compound contains a metal M selected from the group consisting of aluminum, boron, chromium, lanthanum, molybdenum, neodymium, niobium, samarium, tantalum, titanium, tungsten, vanadium, yttrium, and zirconium, with 0.001 to 10 weight percent of a rearrangement catalyst at a temperature of 100° to 340° C. while distilling by-produced volatile materials until there is produced a halogen-containing metallopolysilane composed of [$R_2Si$], [RSi], and [M] units where R is an alkyl radical containing 1 to 4 carbon atoms and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [$R_2Si$] units, 40 to 99.9 mole percent of [RSi] units, and 0.1 to 10 mole percent of [M] units, and where the other bonds on silicon are attached to other silicon atoms and halogen atoms.

2. A method as defined in claim 1 where M is aluminum.

3. A method as defined in claim 2 where the reactive metal compound is $AlBr_3$ or $AlCl_3$.

4. A method as defined in claim 1 where M is boron.

5. A method as defined in claim 4 where the reactive metal compound is $BBr_3$ or $BCl_3$.

6. A method as defined in claim 1 wherein M is chromium.

7. A method as defined in claim 6 where the reactive metal compound is $CrCl_2$, $CrCl_3$, or chromium hexacarbonyl.

8. A method as defined in claim 1 where M is molybdenum.

9. A method as defined in claim 8 where the reactive metal compound is $MoCl_5$, bis(cyclopentadienyl)molybdenum dichloride, or molybdenum hexacarbonyl.

10. A method as defined in claim 1 where M is lanthanum, neodymium, or samarium.

11. A method as defined in claim 1 where M is niobium.

12. A method as defined in claim 11 where the reactive metal compound is $NbCl_5$ or bis(cyclopentadienyl)niobium tribromide.

13. A method as defined in claim 1 where M is tantalum.

14. A method as defined in claim 13 where the reactive metal compound is $TaCl_5$ or bis(cyclopentadienyl)tantalum tribromide.

15. A method as defined in claim 1 where M is titanium.

16. A method as defined in claim 15 where the reactive metal compound is $TiBr_4$, $TiCl_4$, or bis(cyclopentadienyl)titanium dichloride.

17. A method as defined in claim 1 where M is tungsten.

18. A method as defined in claim 17 where the reactive metal compound is tungsten hexacarbonyl.

19. A method as defined in claim 1 where M is vanadium.

20. A method as defined in claim 19 where the reactive metal compound is $VCl_3$, bis(cyclopentadienyl)vanadium dibromide, or bis(cyclopentadienyl)vanadium dichloride.

21. A method as defined in claim 1 where M is yttrium.

22. A method as defined in claim 21 where the reactive metal compound is $YBr_3$ or $YCl_3$.

23. A method as defined in claim 1 where M is zirconium.

24. A method as defined in claim 23 where the reactive metal compound is $ZrBr_4$, $ZrCl_4$, or bis(cyclopentadienyl)zirconium dichloride.

25. A method of preparing a halogen-containing metallopolysilane, which method comprises treating a mixture of organohalogendisilanes containing 0 to 60 weight percent of a monoorganosilane of formula $R'SiX_3$ and 1 to 20 weight percent reactive metal compound, where R' is an alkyl radical containing five or more carbon atoms or a phenyl radical, X is chlorine or bromine, and the reactive metal compound contains a metal M selected from the group consisting of aluminum, boron, chromium, lanthanum, molybdenum, neodymium, niobium, samarium, tantalum, titanium, tungsten, vanadium, yttrium, and zirconium, with 0.001 to 10 weight percent of a rearrangement catalyst at a temperature of 100° to 340° C. while distilling by-produced volatile materials until there is produced a halogen-containing metallopolysilane composed of [$R_2Si$], [RSi], [R'Si], and [M] units where R is an alkyl radical containing 1 to 4 carbon atoms, R' is an alkyl radical containing five or more carbon atoms or a phenyl radical, and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [$R_2Si$] units, 40 to 99.9 mole percent of [RSi] units, 0 to 99.9 mole percent [R'Si] units, and 0.1 to 10 mole percent of [M] units, and where the other bonds on silicon are attached to other silicon atoms and halogen atoms.

26. A halogen-containing metallopolysilane composed of [$R_2Si$], [RSi], and [M] units where R is an alkyl radical containing 1 to 4 carbon atoms and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [$R_2Si$] units, 40 to 99.9 mole percent of [RSi] units, and 0.1 to 10 mole percent of [M] units, and where the other bonds on silicon are attached to other silicon atoms and halogen atoms.

27. A halogen-containing metallopolysilane as defined in claim 26 where M is aluminum.

28. A halogen-containing metallopolysilane as defined in claim 26 where M is boron.

29. A halogen-containing metallopolysilane as defined in claim 26 where M is chromium.

30. A halogen-containing metallopolysilane as defined in claim 26 where M is molybdenum.

31. A halogen-containing metallopolysilane as defined in claim 26 where M is lanthanum, neodymium, or samarium.

32. A halogen-containing metallopolysilane as defined in claim 26 where M is niobium.

33. A halogen-containing metallopolysilane as defined in claim 26 where M is tantalum.

34. A halogen-containing metallopolysilane as defined in claim 26 where M is titanium.

35. A halogen-containing metallopolysilane as defined in claim 26 where M is tungsten.

36. A halogen-containing metallopolysilane as defined in claim 26 where M is vanadium.

37. A halogen-containing metallopolysilane as defined in claim 26 where M is yttrium.

38. A halogen-containing metallopolysilane as defined in claim 26 where M is zirconium.

39. A halogen-containing metallopolysilane composed of [$R_2Si$], [RSi], [R'Si], and [M] units where R is an alkyl radical containing 1 to 4 carbon atoms, R' is an alkyl radical containing at least 5 carbon atoms or a phenyl radical, and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [$R_2Si$] units, 40 to 99.9 mole percent of [RSi] units, 0 to 99.9 mole percent [R'Si] units, and 0.1 to 10 mole percent of [M] units, and where the other bonds on silicon are attached to other silicon atoms and halogen atoms.

40. A halogen-containing metallopolysilane as defined in claim 39 where R' is an alkyl radical containing from 6 to 20 carbon atoms or a phenyl radical.

41. A halogen-containing metallopolysilane as defined in claim 34 where the metallopolysilane contains 0.5 to 5 mole percent [M] units.

42. A halogen-containing metallopolysilane as defined in claim 41 where M is aluminum.

43. A halogen-containing metallopolysilane as defined in claim 41 where M is boron.

44. A halogen-containing metallopolysilane as defined in claim 41 where M is chromium.

45. A halogen-containing metallopolysilane as defined in claim 41 where M is molybdenum.

46. A halogen-containing metallopolysilane as defined in claim 41 where M is lanthanum, neodymium, or samarium.

47. A halogen-containing metallopolysilane as defined in claim 41 where M is niobium.

48. A halogen-containing metallopolysilane as defined in claim 41 where M is tantalum.

49. A halogen-containing metallopolysilane as defined in claim 41 where M is titanium.

50. A halogen-containing metallopolysilane as defined in claim 41 where M is tungsten.

51. A halogen-containing metallopolysilane as defined in claim 41 where M is vanadium.

52. A halogen-containing metallopolysilane as defined in claim 41 where M is yttrium.

53. A halogen-containing metallopolysilane as defined in claim 41 where M is zirconium.

54. A method of preparing a R" radical-containing metallopolysilane, which method consists of reacting under anhydrous conditions, a halogen-containing metallopolysilane with a Grignard reagent having the general formula R"MgX' or an organolithium compound having the general formula R"Li where X' is chlorine, bromine, or iodine and R″ is an alkyl radical containing 1 to 20 carbon atoms, a vinyl radical, or a phenyl radical, at a temperature of 0° to 120° C., in a suitable solvent, and thereafter recovering the R″ radical-containing metallopolysilane; where the halogen-containing metallopolysilane is composed of [R$_2$Si], [RSi], [R′Si], and [M] units where R is an alkyl radical containing 1 to 4 carbon atoms, R′ is an alkyl radical containing at least 5 carbon atoms or a phenyl radical, and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [R$_2$Si] units, 40 to 99.9 mole percent of [RSi] units, 0 to 99.9 mole percent [R′Si] units, and 0.1 to 10 mole percent of [M] units, and where the other bonds on silicon are attached to other silicon atoms and halogen atoms.

55. A method as defined in claim 54 where R′ is an alkyl radical containing 6 to 20 carbon atoms and the halogen-containing metallopolysilane contains 0.5 to 5 mole percent [M] units.

56. A R″ radical-containing metallopolysilane as produced by the method of claim 55.

57. A method of preparing a R‴O— or RO-containing metallopolysilane, which method consists of reacting under anhydrous conditions, a halogen-containing metallopolysilane with a reagent selected from the group consisting of (i) carbinols having the general formula R‴OH, (ii) alcoholates having the general formula R‴OQ, and (iii) alkyl orthoformates having the general formula (RO)$_3$CH wherein R‴ is an alkyl radical containing 1 to 4 carbon atoms or a phenyl radical, R is an alkyl radical containing 1 to 4 carbon atoms, and Q is sodium, potassium, or lithium, at a temperature of 0° to 110° C., in a suitable solvent, and thereafter recovering the R‴O— or RO-containing metallopolysilane; where the halogen-containing metallopolysilane is composed of [R$_2$Si], [RSi], [R′Si], and [M] units where R is an alkyl radical containing 1 to 4 carbon atoms, R′ is an alkyl radical containing at least 5 carbon atoms or a phenyl radical, and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.9 mole percent of [R$_2$Si] units, 40 to 99.9 mole percent of [RSi] units, 0 to 99.9 mole percent [R′Si] units, and 0.1 to 10 mole percent of [M] units, and where the other bonds on silicon are attached to other silicon atoms and halogen atoms.

58. A method as defined in claim 57 where R′ is an alkyl radical containing 6 to 20 carbon atoms or a phenyl radical and the halogen-containing metallopolysilane contains 0.5 to 5 mole percent [M] units.

59. A R‴O— or RO-containing metallopolysilane as produced by the method of claim 58.

60. A method of preparing a R$^{iv}_2$N-containing metallopolysilane, which method consists of reacting under anhydrous conditions, a halogen-containing metallopolysilane with an aminolysis reagent having the general formula NHR$^{iv}_2$ wherein R$^{iv}$ is hydrogen, an alkyl radical containing 1 to 4 carbon atoms, a phenyl radical or a —SiR$^v_3$ radical wherein R$^v$ is an alkyl radical containing 1 to 4 carbon atoms, a vinyl radical, or a phenyl radical, at a temperature of from 25° to 100° C., in a suitable solvent, and thereafter recovering the R$^{iv}_2$N-containing metallopolysilane; where the halogen-containing metallopolysilane is composed of [R$_2$Si], [RSi], [R′Si], and [M] units where R is an alkyl radical containing 1 to 4 carbon atoms, R′ is an alkyl radical containing at least 5 carbon atoms or a phenyl radical, and M is a metal selected from the group consisting of aluminum, boron, chromium, lanthanum, molybdenum, neodymium, niobium, samarium, tantalum, titanium, tungsten, vanadium, yttrium, and zirconium, where the halogen-containing metallopolysilane contains 0 to 59.5 mole percent of [R$_2$Si] units, 40 to 99.9 mole percent of [RSi] units, 0 to 99.9 mole percent [R′Si] units, and 0.1 to 10 mole percent of [M] units, and where the other bonds on silicon are attached to other silicon atoms and halogen atoms.

61. A method as defined in claim 60 where R′ is an alkyl radical containing 6 to 20 carbon atoms or a phenyl radical and the halogen-containing metallopolysilane contains 0.5 to 5 mole percent [M] units.

62. A R$^{iv}_2$N-containing metallopolysilane as produced by the method of claim 61.

* * * * *